(12) United States Patent
Heo (10) Patent No.: US 12,509,146 B2
(45) Date of Patent: Dec. 30, 2025

(54) STEERING SYSTEM FOR DUAL JOYSTICK AND CONTROL METHOD THEREFOR

(71) Applicants: Hyundai Motor Company, Seoul (KR); Kia Corporation, Seoul (KR)

(72) Inventor: Jin Hyuck Heo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 875 days.

(21) Appl. No.: 17/742,517

(22) Filed: May 12, 2022

(65) Prior Publication Data
US 2023/0050365 A1 Feb. 16, 2023

(30) Foreign Application Priority Data
Aug. 11, 2021 (KR) .................. 10-2021-0106286

(51) Int. Cl.
 *B62D 6/00* (2006.01)
 *B62D 1/12* (2006.01)
 *B62D 5/00* (2006.01)
(52) U.S. Cl.
 CPC ............. *B62D 6/00* (2013.01); *B62D 1/12* (2013.01); *B62D 5/005* (2013.01)

(58) Field of Classification Search
 CPC ............ B62D 6/00; B62D 1/12; B62D 5/005
 See application file for complete search history.

(56) References Cited

U.S. PATENT DOCUMENTS

| | | | |
|---|---|---|---|
| 7,675,258 B2* | 3/2010 | Dattilo | G05G 1/04 318/575 |
| 2002/0080116 A1* | 6/2002 | Onodera | G05G 9/047 345/161 |
| 2004/0204811 A1* | 10/2004 | Huang | G05G 5/03 701/50 |
| 2020/0299930 A1* | 9/2020 | Wuisan | E02F 9/2012 |

FOREIGN PATENT DOCUMENTS

| | | | | |
|---|---|---|---|---|
| GB | 2494241 A | * | 3/2013 | ............... B62D 6/00 |
| KR | 20190074555 A | | 6/2019 | |

* cited by examiner

*Primary Examiner* — Jacob D Knutson
(74) *Attorney, Agent, or Firm* — Slater Matsil, LLP (57) ABSTRACT

An embodiment steering system for a dual joystick includes left and right joysticks respectively disposed at left and right sides of a seat and configured to rotate about rotary shafts to steer, feedback actuators configured to provide reaction torque and a steering angle variation to the left and right joysticks, respectively, and a controller configured to control the feedback actuators, generate a target steering angle, and steer a vehicle based on a steering input from a driver and factors reflecting a driving state of the vehicle.

5 Claims, 12 Drawing Sheets

STEERING SYSTEM FOR DUAL JOYSTICK AND CONTROL METHOD THEREFOR

CROSS-REFERENCE TO RELATED APPLICATIONS

This application claims the benefit of Korean Patent Application No. 10-2021-0106286, filed on Aug. 11, 2021, which application is hereby incorporated herein by reference.

TECHNICAL FIELD

The present invention relates to a steering system for a dual joystick and a method thereof.

BACKGROUND

A steer-by-wire (SBW) system is a steering system employing electronic control instead of a mechanical connection structure between a steering wheel and a steering rack.

In an SBW system, the steering rack at the lower end is similar in structure to that of an existing motor driven power steering (MDPS) system, but a feedback actuator for generating and transmitting a steering reaction force to a driver is added at the steering wheel at the upper end.

Recently, a study of a joystick has been actively conducted as a steering interface for preparing for future mobilities.

A joystick, in broad meaning, can be classified into a hand-operated joystick and a finger-operated joystick in accordance with the operation method, and, in accordance with the operation principle, can be classified into a displacement joystick in which a predetermined pressure is applied in the same direction as the joystick regardless of the inclination or pressure of the joystick and an isometric joystick in which a pressure is applied in accordance with the inclination and pressure of the joystick.

Since it is required to maintain the relationship between the displacement of a joystick and the actual position of the front wheels and the driving situation of a vehicle should be fed back through the joystick in order to steer using a joystick, a study of a kind of hybrid type joystick that provides active force feedback to a displacement joystick having predetermined displacement and input value has been actively conducted.

Further, a dual joystick concept for steering stability and functional safety has also been proposed.

However, these joysticks are advantageous in term of controlling the posture of a vehicle, but increases fatigue of a driver in long-time driving due to force feedback. Further, when acceleration is laterally applied to a vehicle, the driver's body inclines and the driver unintentionally pulls the joystick positioned in the opposite direction of the inclination, so there is a high possibility of mis-input through the joystick.

Further, there is a defect that the steering sensitivity is high in accordance with the length, thickness, position, shape, etc. of the joystick.

The description provided above as a related art of the present invention is just for helping understanding the background of the present invention and should not be construed as being included in the related art known by those skilled in the art.

SUMMARY

The present invention relates to a steering system for a dual joystick and a method thereof. Particular embodiments relate to a steering system for a dual joystick and a method thereof that can improve steering stability by actively controlling the steering system for a dual joystick.

An embodiment of the present invention provides a steering system for a dual joystick and a method thereof that improves steering stability by actively controlling the steering system for a dual joystick.

A steering system for a dual joystick according to embodiments of the present invention includes left and right joysticks respectively disposed at both sides of a seat and configured to rotate about rotary shafts to steer, feedback actuators configured to provide reaction torque and a steering angle variation to the left and right joysticks, respectively, and a controller configured to control the feedback actuators, generate a target steering angle, and steer a vehicle on the basis of steering input from a driver and factors reflecting a driving state of the vehicle.

The rotary shafts may be disposed in a front-rear direction of the seat and the left and right joysticks may be configured to be symmetric in a neutral state.

Handles of the left and right joysticks may be configured to be inclined at a predetermined angle toward a center of the seat in the neutral state.

The controller may control the feedback actuators to apply the same-directional reaction torque and steering angle variation to the left and right joysticks.

The controller may control the feedback actuators to apply the same reaction torque and the same steering angle variation to the left and right joysticks.

The steering system may further include pressure sensors configured to detect support pressures of a driver's arms operating the joysticks, respectively, in which the controller may determine reliability of steering input on the basis of the support pressures, and may generate a target steering angle and steer the vehicle on the basis of reliable steering input.

The pressure sensors may be installed at portions on which the driver's arms are supported at rear ends of the joysticks.

A method of controlling the steering system for a dual joystick includes a steering-determination step in which the controller determines whether operations of the left and right joysticks satisfy a normal steering condition on the basis of steering input by the operations of the left and right joysticks and the factors reflecting the driving state of the vehicle, and a reaction force control step in which the controller controls the feedback actuators to apply the same-directional reaction torque and steering angle variation to the left and right joysticks when the normal steering condition is satisfied.

The reaction force control step may control the feedback actuators to apply the same reaction torque and the same steering angle variation to the left and right joysticks.

The method may further include a steering control step of calculating an average steering input value of the left and right joysticks, and generating a target steering angle and steering the vehicle on the basis of the calculated average steering input value, when the normal steering condition is satisfied.

The normal steering condition may be that lateral acceleration of the vehicle is a critical value or less, steering angles of the left and right joysticks are a critical value or less, and the steering directions of the left and right joysticks are the same.

The method may further include a pressure detection step of detecting support pressures of the driver's arms operating the joysticks when the normal steering condition is not satisfied, a reliability determination step of determining reliability of steering input of the left and right joysticks on the basis of the support pressures, and a steering control step of generating a target steering angle and steering the vehicle on the basis of reliable steering input.

The pressure detection step may determine that the normal steering condition is not satisfied when the vehicle is rapidly turned, the reliability determination step may determine that the steering input of an outside-in-turning joystick is reliable when the support pressure of the outside-in-turning arm is an upper-limit critical value or more and the support pressure of an inside-in-turning arm is a lower-limit critical value or less while the vehicle is turned, and the steering control step may generate a target steering angle and steer the vehicle on the basis of the steering input of the outside-in-turning joystick.

The method may further include a reaction force control step of fixing the inside-in-turning joystick when it is determined that the steering input of the outside-in-turning joystick is reliable.

In the reaction force control step, reaction torque provided to the inside-in-turning joystick may be increased in proportion to lateral acceleration of the vehicle.

The pressure detection step may determine that the normal steering condition is not satisfied when the vehicle is rapidly turned, the reliability determination step may determine that the steering inputs of the inside-in-turning and outside-in-turning joysticks are both reliable when the support pressure of the outside-in-turning arm is less than the upper-limit critical value or the support pressure of the inside-in-turning arm exceeds the lower-limit critical value while the vehicle is turned, and the steering control step may calculate an average steering input value of the inside-in-turning and outside-in-turning joysticks, and may generate a target steering angle and steer the vehicle on the basis of the calculated average steering input value.

The pressure detection step may determine that the normal steering condition is not satisfied when steering inputs are applied in opposite directions to the left and right joysticks, the reliability determination step may determine that the steering input of a joystick having large steering torque is reliable when the support pressure of an arm holding the joystick having large steering torque exceeds the lower-limit critical value and the support pressure of an arm holding a joystick having small steering torque is less than the lower-limit critical value, and the steering control step may generate a target steering angle and steer the vehicle on the basis of the steering input of the joystick having large steering torque.

The method may further include a reaction force control step of synchronizing a steering direction of the joystick having small steering torque with a steering direction of the joystick having large steering torque when it is determined that the steering input of the joystick having large steering torque is reliable.

The pressure detection step may determine that the normal steering condition is not satisfied when steering inputs are applied in opposite directions to the left and right joysticks, the reliability determination step may determine that the steering input of a joystick having large steering torque is reliable when the support pressure of an arm holding the joystick having large steering torque is the lower-limit critical value or less or when the support pressure of an arm holding a joystick having small steering torque is the lower-limit critical value or more, and the steering control step may calculate an average steering input value of the left and right joysticks, and may generate a target steering angle and steer the vehicle on the basis of the calculated average steering input value.

The method may further include a steering force control step of providing reaction torque to the joystick having small steering torque by a steering torque difference between the left and right joysticks when it is determined that the steering input of the joystick having large steering torque is reliable.

The reaction torque may be provided to the joystick having small steering torque in a haptic type.

Embodiments of the present invention have an effect of preventing unintentional steering input due to inclination of the driver's body when a vehicle is rapidly turned, thereby improving steering stability.

Further, there is an effect that when mis-input or steering input by external factors is applied to one of two joysticks, a vehicle is steered on the basis of the steering input that the driver has intended, whereby steering reliability is remarkably improved.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF ILLUSTRATIVE EMBODIMENTS

Exemplary embodiments of the present invention are described hereafter in detail with reference to the accompanying drawings.

Figure 1:
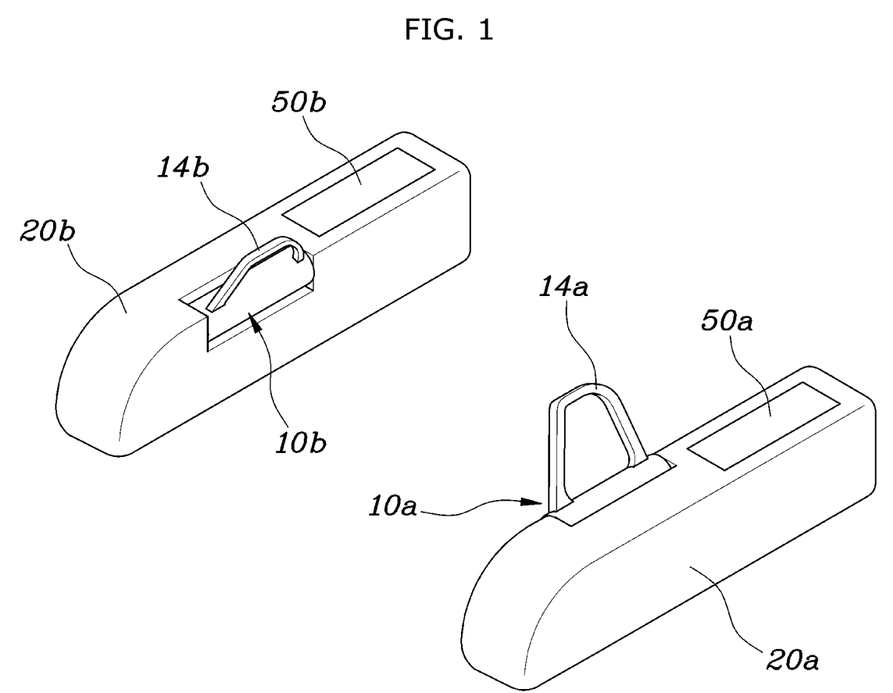
FIG. 1 is a view showing the shape of a dual joystick according to embodiments of the present invention.
Figure 2:
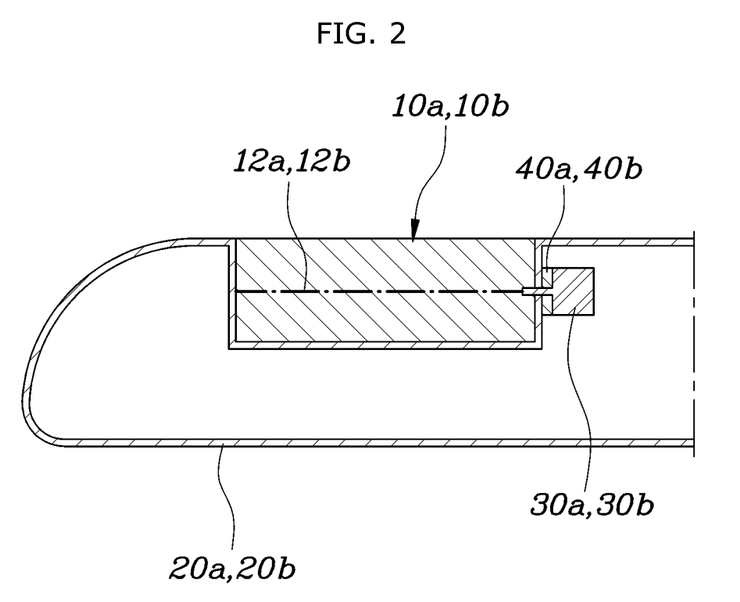
FIG. 2 is a lateral cross-sectional view of the joystick according to embodiments of the present invention.
Figure 7:
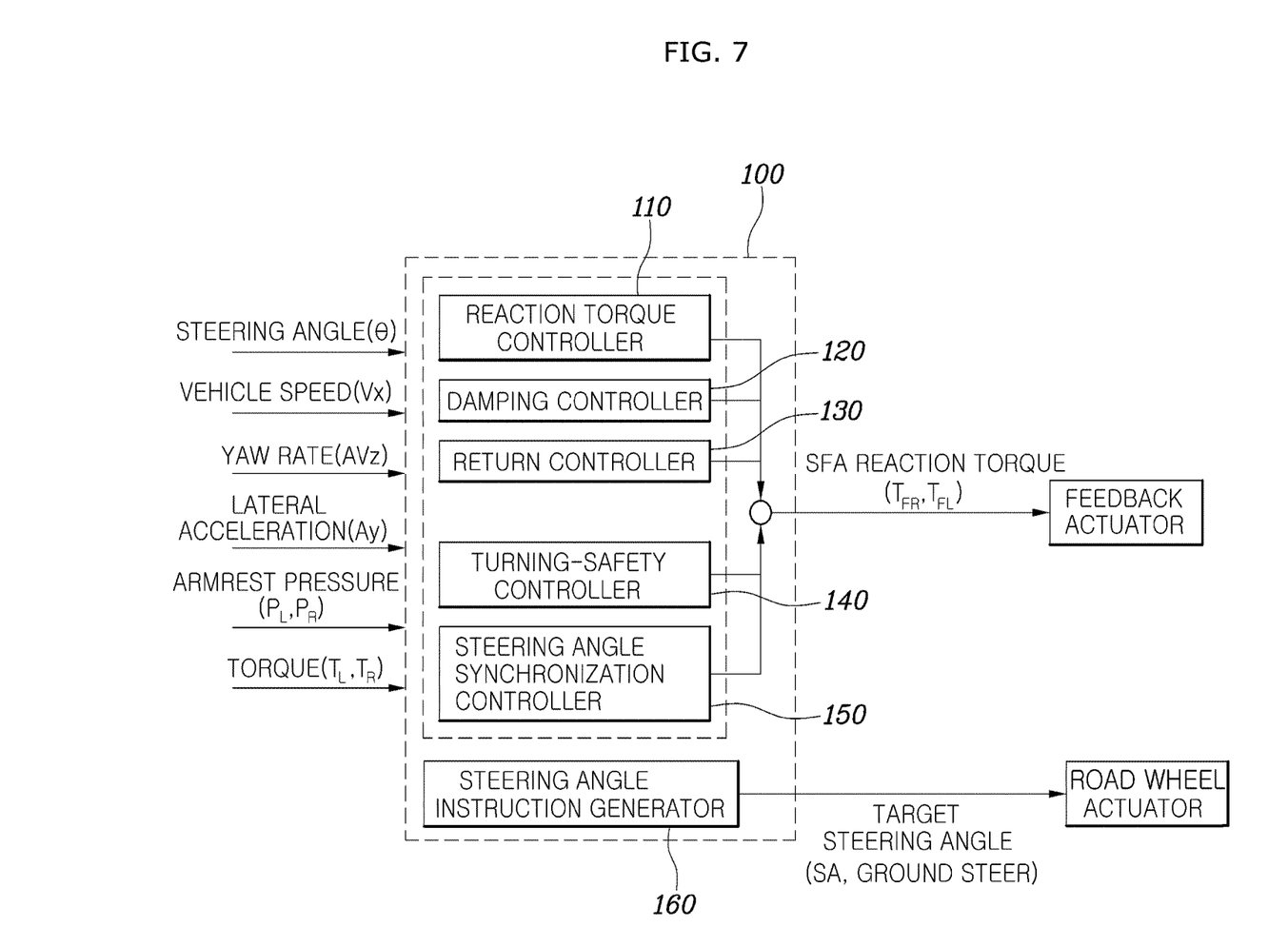
FIG. 7 is a block diagram showing a steering system for a dual joystick according to embodiments of the present invention.

FIG. 1 is a view showing the shape of a dual joystick according to embodiments of the present invention, FIG. 2 is a lateral cross-sectional view of the joystick according to embodiments of the present invention, and FIG. 7 is a block diagram showing a steering system for a dual joystick according to embodiments of the present invention.

Referring to the figures, a system for controlling a dual joystick of embodiments of the present invention includes left and right joysticks 10a and 10b disposed at both sides of a seat, respectively, and steering by rotating about rotary shaft 12a and 12b, respectively, feedback actuators 30a and 30b providing reaction torque and a steering angle variation to the left and right joysticks 10a and 10b, respectively, and a controller 100 controlling the feedback actuators 30a and 30b, generating a target steering angle, and steering the vehicle on the basis of steering input from a driver and factors reflecting the driving state of a vehicle.

For example, armrests 20a and 20b are installed at the left and right of a driver seat, respectively, and the joysticks 10a and 10b are installed at the fronts of the armrests 20a and 20b, respectively.

The rotary shafts 12a and 12b of the joysticks 10a and 10b are installed in the armrests 20a and 20b, respectively, and handles 14a and 14b of the joysticks 10a and 10b are formed in rectangular ring shapes in the front-rear direction on sides of the rotary shafts 12a and 12b, respectively.

The feedback actuators 30a and 30b, respectively, are disposed in the left and right armrests 20a and 20b, are connected to the rotary shafts 12a and 12b of the joysticks 10a and 10b, and provide reaction torque to the joysticks 10a and 10b.

Torque sensors 40a and 40b, respectively, are installed on the rotary shafts 12a and 12b and detect steering torque by operation of the joysticks 10a and 10b.

A steering angle instruction generator 160 in the controller 100 generates a target steering angle on the basis of steering input of the joysticks 10a and 10b and a road wheel actuator 60 at the lower end of an SBW system is controlled on the basis of the target steering angle, whereby the vehicle is steered.

The steering input from a driver may be a steering angle, a steering angle speed, steering torque, etc. of the joysticks 10a and 10b, and the factors reflecting the driving state of a vehicle may be a vehicle speed, a yaw rate, lateral acceleration, etc.

For reference, the controller 100 according to exemplary embodiments of the present invention can be implemented through a nonvolatile memory (not shown) configured to store algorithms for controlling operation of various components of a vehicle or data about software commands for executing the algorithms, and a processor (not shown) configured to perform operations to be described below using the data stored in the memory. The memory and the processor may be individual chips. Alternatively, the memory and the processor may be integrated in a single chip. The processor may be implemented as one or more processors.

Figure 3:
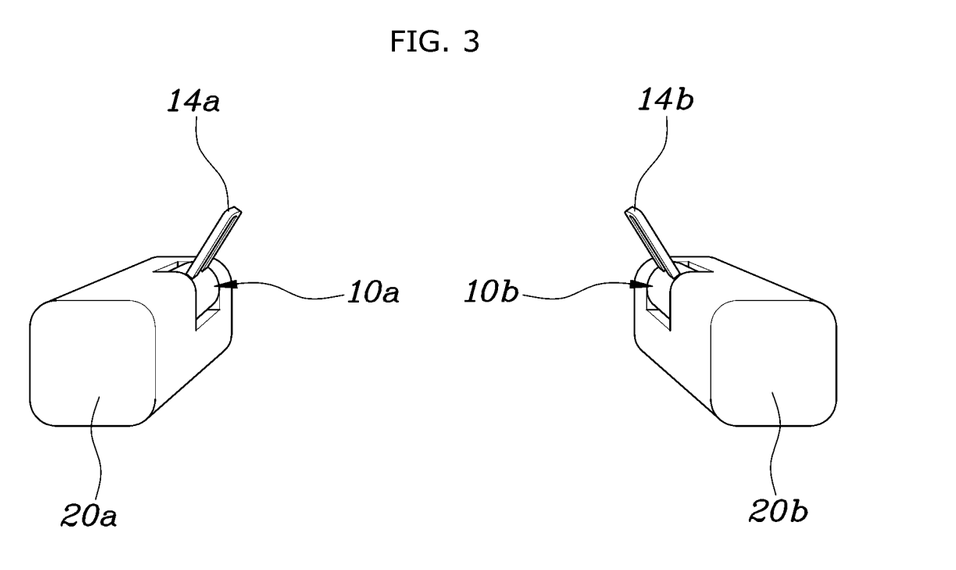
FIG. 3 is a view showing a neutral state of a dual joystick according to embodiments of the present invention.

FIG. 3 is a view showing a neutral state of a dual joystick according to embodiments of the present invention.

Referring to the figure, the rotary shafts 12a and 12b are disposed in the front-rear direction with respect to a seat and the left and right joysticks 10a and 10b are symmetrically positioned in the neutral state.

The handles 14a and 14b of the left and right joysticks 10a and 10b are inclined at a predetermined angle toward the center of the seat in the neutral state.

For example, in the neutral state, the handle 14a of the left joystick 10a is inclined 30° right and the handle 14b of the right joystick 10a is inclined 30° left, whereby steering is performed left and right by rotating the joysticks 10a and 10b 30° left and right.

Accordingly, left/right full turns are possible within the rotation range of the driver's wrists, whereby steering convenience is increased.

Figure 4:
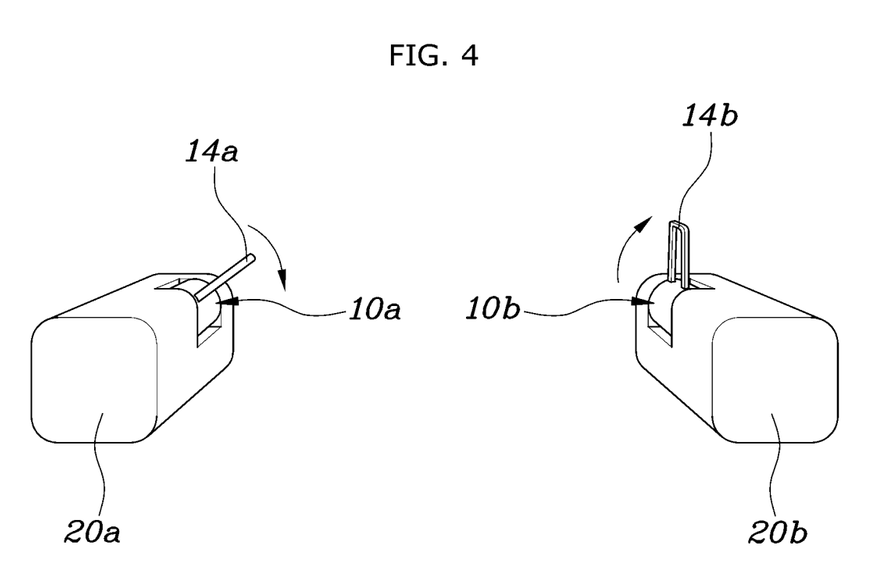
FIG. 4 is a view exemplifying a right full-turn state of the dual joystick according to embodiments of the present invention.
Figure 5:
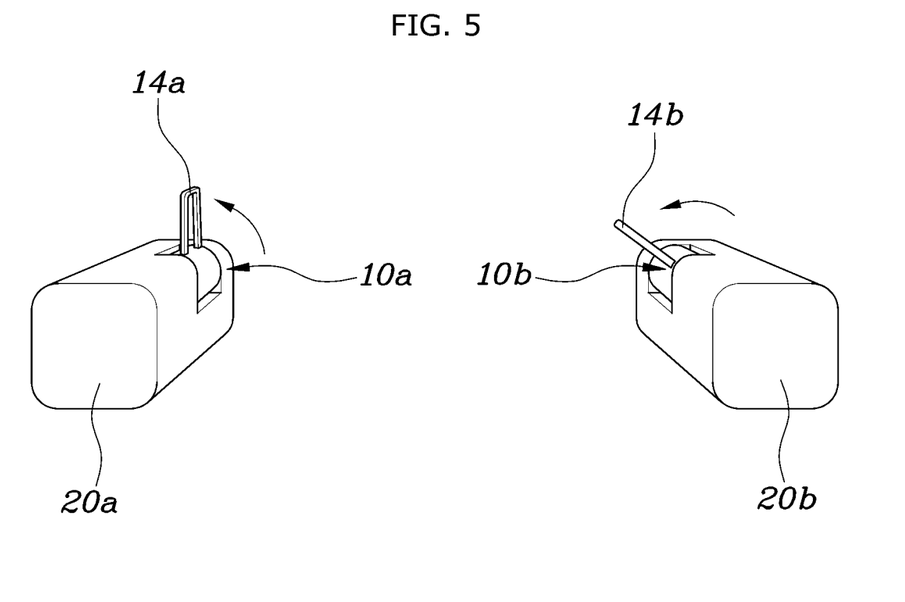
FIG. 5 is a view exemplifying a left full-turn state of the dual joystick according to embodiments of the present invention.

FIG. 4 is a view exemplifying a right full-turn state of the dual joystick according to embodiments of the present invention and FIG. 5 is a view exemplifying a left full-turn state of the dual joystick according to embodiments of the present invention.

Referring to the drawings, the controller 100 controls the feedback actuators 30a and 30b to apply the same-directional reaction torque and steering angle variation to the left and right joysticks 10a and 10b.

Further, the controller 100 may control the feedback actuators 30a and 30b to apply the same reaction torque and the same steering angle variation to the left and right joysticks 10a and 10a.

That is, the controller 100 controls the reaction torque and the steering angle variation of the feedback actuators such that the steering inputs of the left and right joysticks 10a and 10b are matched in 1:1.

Accordingly, in the left full turn, the left and right joysticks 10a and 10b are rotated 30° left, so the handle 14a of the left joystick 10a is vertically erected, while, in the right full turn, the left and right joysticks 10a and 10b are rotated 30° right, so the handle 14b of the right joystick 10b is vertically erected.

Steering reaction force feedback control of the left and right joysticks 10a and 10b through the feedback actuators 30a and 30b, as shown in FIG. 7, is made by a reaction torque controller 110, a damping controller 120, a return controller 130, a turning-safety controller 140, and a steering angle synchronization controller 150.

Figure 8:
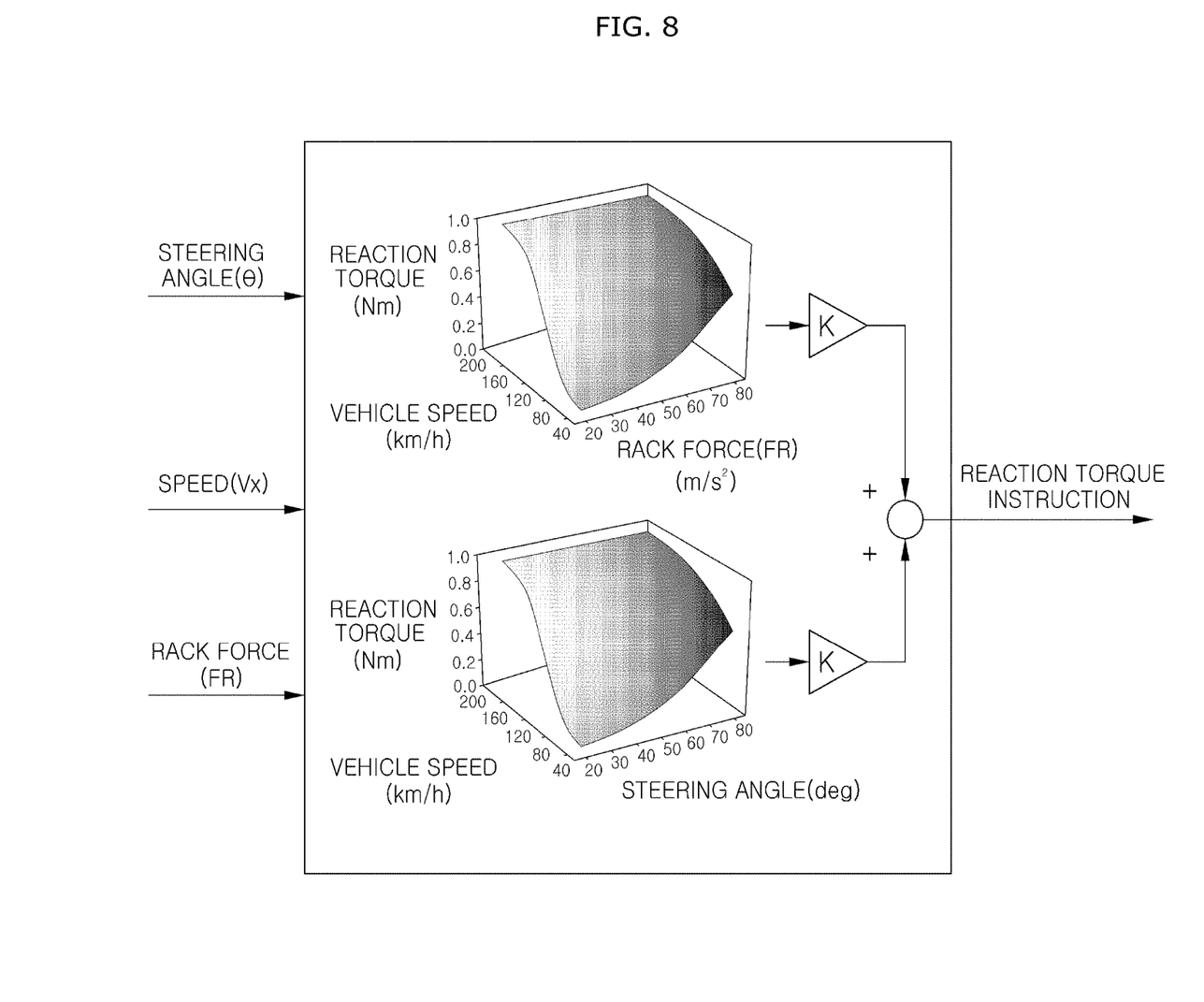
FIG. 8 is a view illustrating a reaction torque control logic shown in FIG. 7.

FIG. 8 is a view illustrating a control logic of the reaction torque controller 110 shown in FIG. 7. Reaction torque control is performed to achieve both of a constant steering feeling and road surface feedback by fundamentally generating fundamental reaction torque on the basis of vehicle speed-steering angle and adding feedback torque calculated on the basis of rack force to the reaction torque. The rack force and the steering angle based on a steering angle are input in a map type and are used as tuning factors.

Figure 9:
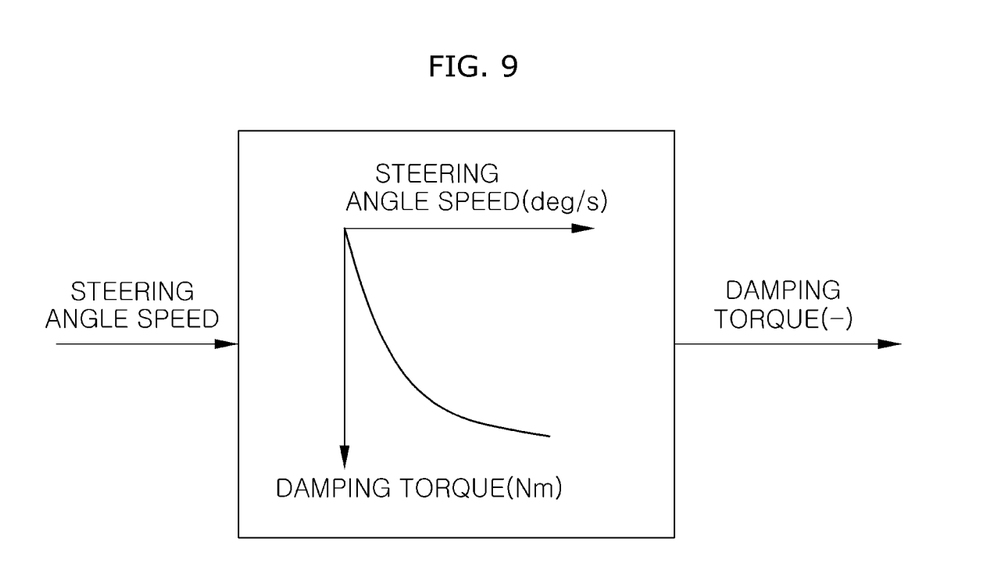
FIG. 9 is a view illustrating a damping control logic shown in FIG. 7.

FIG. 9 is a view illustrating the control logic of the damping controller according to FIG. 7. Damping control that is proportioned to a steering angle speed is performed to secure steering stability for rapid steering input.

Figure 10:
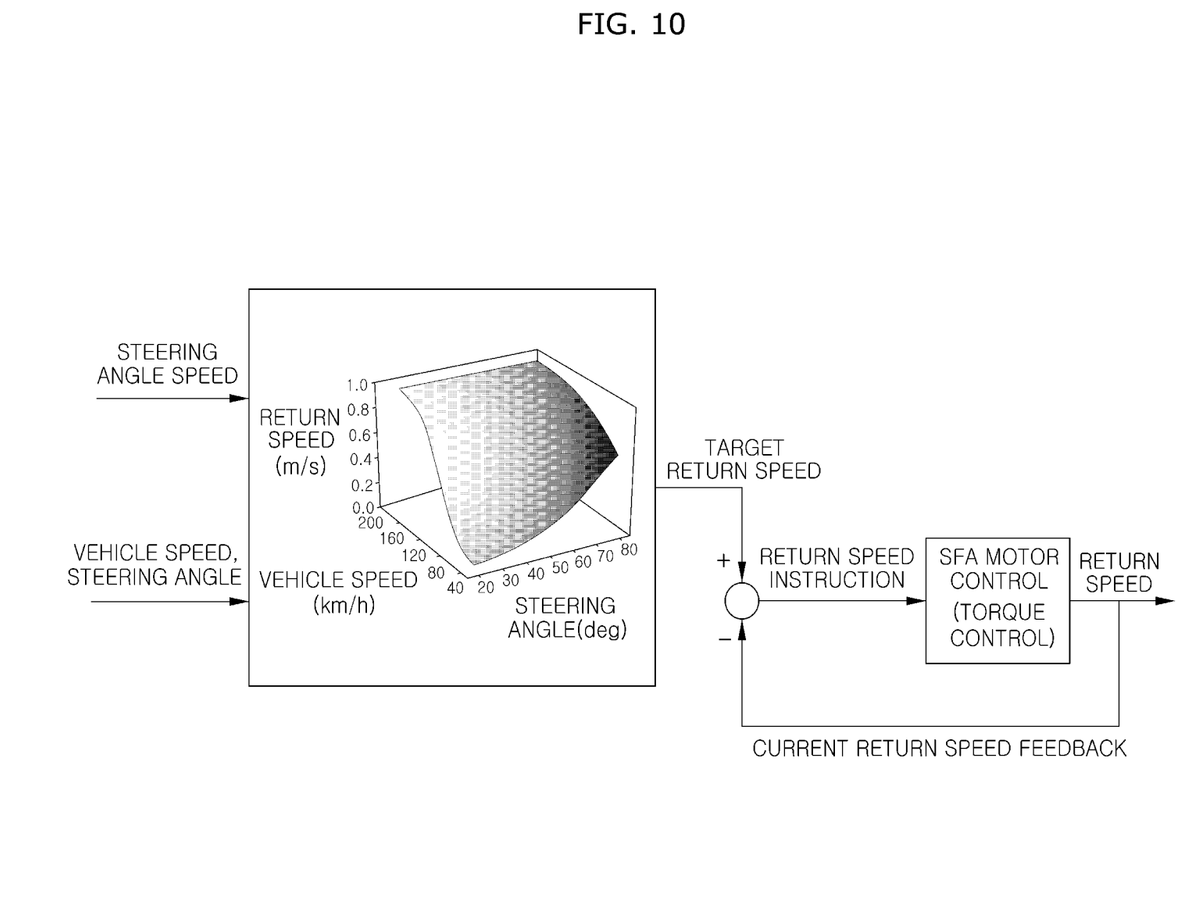
FIG. 10 is a view illustrating a return control logic shown in FIG. 7.

FIG. 10 is a view illustrating the control logic of the return controller of FIG. 7. When a driver takes his/her hands off a steering wheel after turning the steering wheel, the steering wheel should be returned to on-center in proportion to the reduction of lateral acceleration by reaction torque generated by proportional control of lateral acceleration and the steering angle. However, if the intensity of steering reaction is not sufficient or excessive, the steering wheel may not be appropriately returned to on-center.

Accordingly, in order to prevent this situation, feedback return control that controls the return speed in proportion to the vehicle speed and the steering angle is performed when the driver releases the joysticks 10a and 10b.

Figure 6:
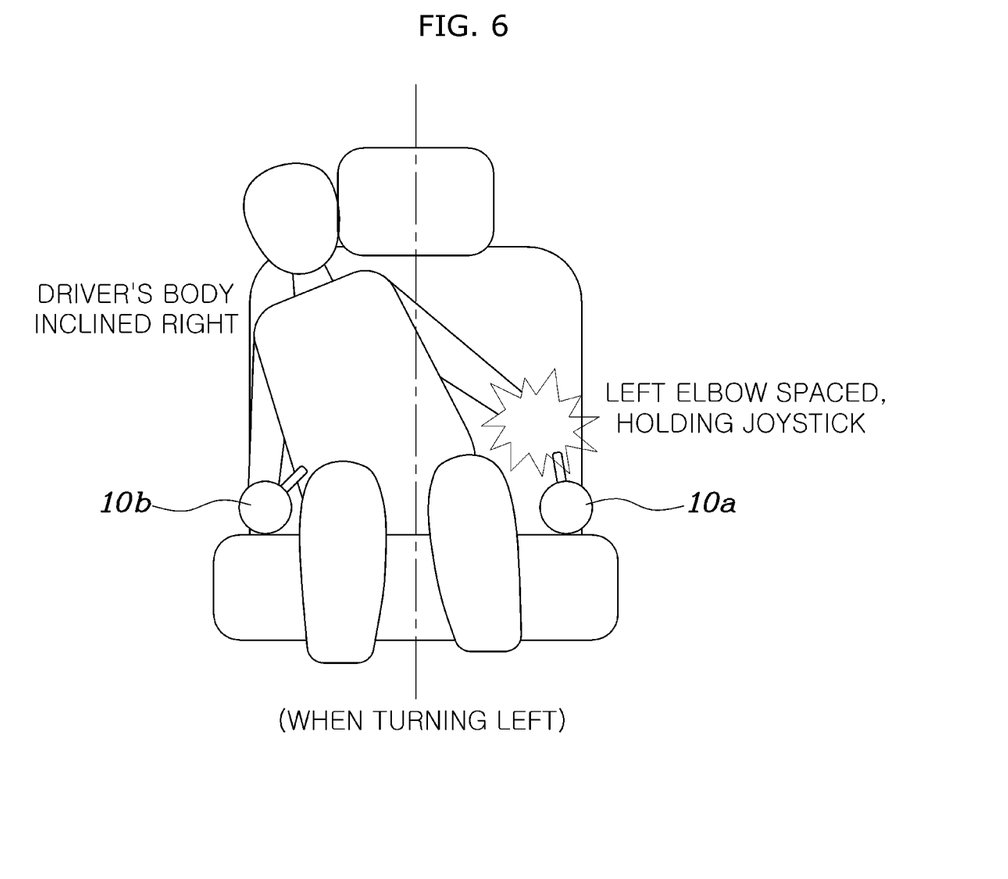
FIG. 6 is a view showing mis-operation of joysticks due to inclination of the driver's body when a vehicle is rapidly turned.

FIG. 6 is a view showing mis-operation of the joysticks 10a and 10b due to inclination of the driver's body when a vehicle is rapidly turned. When a vehicle is rapidly turned, the body of a driver inclines outward and supports an arm on the outside-in-turning armrest to resist the lateral acceleration and naturally pulls the inside-in-turning joystick, whereby there is a possibility that the vehicle is unintentionally steered by the inside-in-turning joystick.

In order to solve this problem, the turning-safety controller 140 and the steering angle synchronization controller 150 are added, as shown in FIG. 7.

In order to achieve the functions of the turning-safety controller 140 and the steering angle synchronization controller 150, embodiments of the present invention further include pressure sensors 50a and 50b that detect the support pressures of the driver's arms that operate the joysticks 10a and 10b, as shown in FIG. 1. The controller 100 can determine reliability of steering input on the basis of the support pressures, and can generate a target steering angle and steer the vehicle on the basis of the reliable steering input.

The pressure sensors 50a and 50b may be installed at portions on which the driver's arms are supported at the rear ends of the joysticks 10a and 10b, which may be the tops of the rear ends of the armrests 20a and 20b.

For example, when the driver's body inclines outward and the driver pulls the inside-in-turning joystick while a vehicle is turned, the turning-safety controller 140 prevents unintentional steering due to the inside-in-turning joystick by fixing the inside-in-turning joystick.

Further, the turning-safety controller 140 generates a target steering angle instruction on the basis of the outside-in-turning steering angle for steering stability of the vehicle.

Although the same-directional steering torque and steering angle variation are input to the left and right joysticks 10a and 10b in a general normal steering situation, opposite-directional steering inputs may be input to the left and right joysticks 10a and 10b due to the driver's unskillful operation of the joysticks 10a and 10b or other external factors.

In this case, the steering angle synchronization controller 150 determines the driver's steering intention by comparing the steering torque input to the left and right joysticks 10a and 10b with the support pressures of the arms supported on the left and right armrests 20a and 20b and generates a steering angle instruction in the steering direction actually intended by the driver, thereby improving the steering stability.

Further, the steering angle synchronization controller 150 applies a reaction force and a steering angle variation to the joystick having large steering input torque by the difference between the left and right steering torque, whereby the vehicle can be induced to be controlled on the basis of the joystick having large steering input torque.

Figure 11:
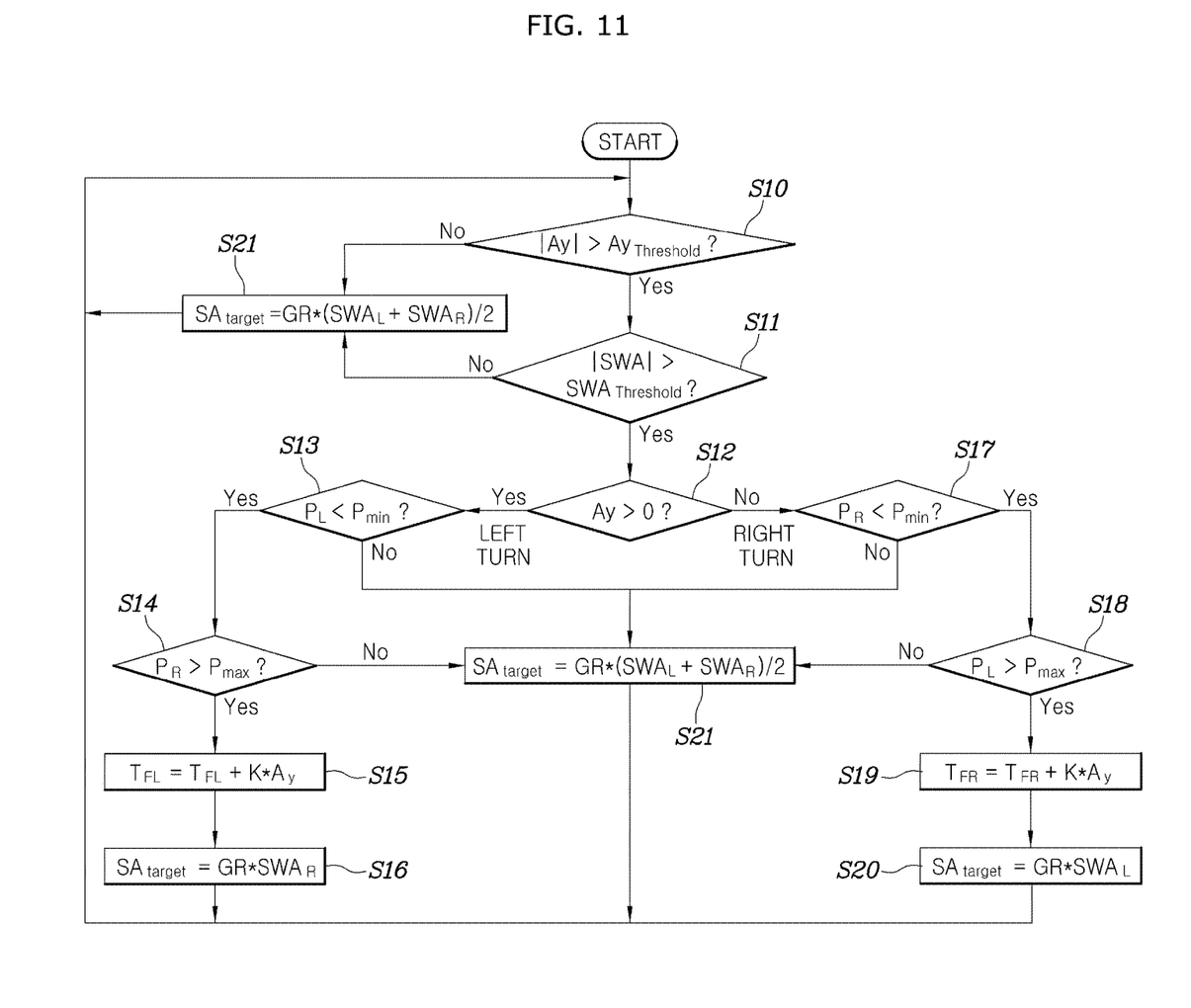
FIG. 11 is a flowchart showing a control process of a turning-safety control logic according to embodiments of the present invention.
Figure 12:
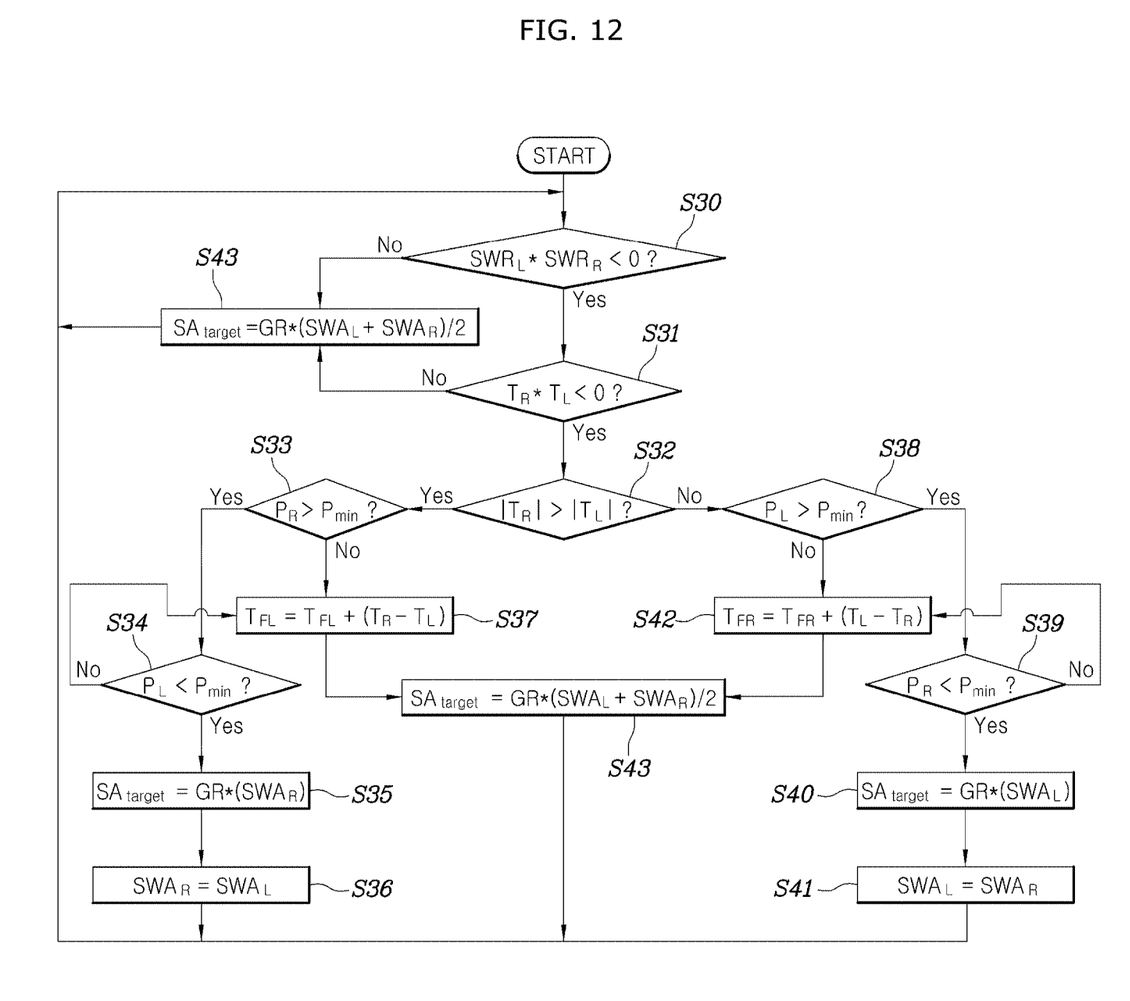
FIG. 12 is a flowchart showing a control process of a steering angle synchronization control logic according to embodiments of the present invention.

FIG. 11 is a flowchart showing a control process of a turning-safety control logic according to embodiments of the present invention, and FIG. 12 is a flowchart showing a control process of a steering angle synchronization control logic according to embodiments of the present invention.

Referring to the figures, various embodiments of the present invention relate to a method of controlling a dual joystick system. The method includes a steering-determination step in which the controller 100 determines whether operations of the left and right joysticks 10a and 10b satisfy a normal steering condition on the basis of steering input by the operations of the left and right joysticks 10a and 10b and factors reflecting the driving state of the vehicle, and a reaction force control step in which the controller boo controls the feedback actuators 30a and 30b to apply the same-directional reaction torque and steering angle variation to the left and right joysticks 10a and 10b when the normal steering condition is satisfied.

The reaction force control step controls the feedback actuators 30a and 30b to apply the same-directional reaction torque and steering angle variation to the left and right joysticks 10a and 10b.

That is, steering by the left and right joysticks 10a and 10b is controlled in the same direction with the same force and rotation variation, whereby steering stability and convenience of the dual joystick 10a, 10b are improved.

The method may further include a steering control step of calculating the average steering input value of the left and right joysticks 10a and 10b, generating a target steering angle, and steering the vehicle on the basis of the calculated average steering input value, when the normal steering condition is satisfied.

For example, it is possible to calculate the average steering angle of the left and right joysticks 10a and 10b and generate a target steering angle using the calculated average steering angle.

The normal steering condition may be that the lateral acceleration of the vehicle is a critical value or less, the steering angles of the left and right joysticks 10a and 10b are a critical value or less, and the steering directions of the left and right joysticks 10a and 10b are the same.

That is, when the vehicle is driven without rapidly turning or the left and right joysticks 10a and 10b are rotated in the same direction, it is determined as the normal steering condition.

However, when the normal steering condition is not satisfied, reliability of the left and right steering inputs are determined on the basis of the support pressures of the driver's arms and the vehicle is steered on the basis of the reliable steering input.

In detail, the method may further include a pressure detection step of detecting the support pressures of the driver's arms operating the joysticks 10a and 10b when the normal steering condition is not satisfied, a reliability determination step of determining reliability of steering input of the left and right joysticks 10a and 10b on the basis of the support pressures, and a steering control step of generating a target steering angle and steering the vehicle on the basis of reliable steering input.

FIG. 11 is a control logic when the normal steering condition is not satisfied due to rapid turning of a vehicle.

Referring to the figure, the pressure detection step determines that the normal steering condition is not satisfied when the vehicle is rapidly turned, the reliability determination step determines that the steering input of the outside-in-turning joystick is reliable when the support pressure of the outside-in-turning arm is an upper-limit critical value or more and the support pressure of the inside-in-turning arm is a lower-limit critical value or less while the vehicle is turned, and the steering control step generates a target steering angle and steers the vehicle on the basis of the steering input of the outside-in-turning joystick.

That is, when support pressure of the left arm positioned at the inside-in-turning is excessively low and the support pressure of the right arm positioned at the outside-in-turning is excessively high while the vehicle is rapidly turned left, it is determined that the steering input of the right joystick 10a is reliable. Accordingly, the vehicle is steered on the basis of the reliable steering input of the right joystick 10b.

The method may further include a reaction force control step of fixing the inside-in-turning joystick when it is determined that the steering input of the outside-in-turning joystick is reliable, as shown in FIG. 11.

In the reaction force control step, the reaction torque provided to the inside-in-turning joystick may be increased in proportion to the lateral acceleration of the vehicle.

That is, when the vehicle is rapidly turned left, the driver holds on to the left joystick 10a, so the driver may pull the left joystick 10a to the outside-in-turning.

Accordingly, the reaction force provided to the left joystick 10a is increased in proportion to the lateral acceleration, whereby the left joystick 10a is made like a structure. Accordingly, the driver can maintain the balance of his/her body by holding the left joystick 10a, and the steering stability is improved by preventing unintentional steering by the left joystick 10a.

The pressure detection step may determine that the normal steering condition is not satisfied when the vehicle is rapidly turned, the reliability determination step may determine that the steering inputs of the inside-in-turning and outside-in-turning joysticks are both reliable when the support pressure of the outside-in-turning arm is less than the upper-limit critical value or the support pressure of the inside-in-turning arm exceeds the lower-limit critical value while the vehicle is turned, and the steering control step may calculate the average steering input value of the inside-in-turning and outside-in-turning joysticks, and may generate a target steering angle and steer the vehicle on the basis of the calculated average steering input value.

That is, when support pressure of the left arm positioned at the inside-in-turning is not excessively low and the support pressure of the right arm positioned at the outside-in-turning is not excessively high while the vehicle is rapidly turned left, it is determined that the steering inputs of the left and right joysticks 10a and 10b are both reliable. Accordingly, the vehicle is steered on the basis of the average of the reliable steering angles of the left and right joysticks 10a and 10b.

FIG. 12 shows a control logic when the left and right joysticks 10a and 10b are rotated in opposite directions and the normal steering condition is not satisfied.

Referring to the figure, the pressure detection step determines that the normal steering condition is not satisfied when steering inputs are applied in opposite directions to the left and right joysticks 10a and 10b, the reliability determination step determines that the steering input of the joystick having large steering torque is reliable when the support pressure of the arm holding the joystick having large steering torque exceeds the lower-limit critical value and the support pressure of the arm holding the joystick having large steering torque is less than the lower-limit critical value, and the steering control step generates a target steering angle and steers the vehicle on the basis of the steering input of the joystick having large steering torque.

That is, when the left and right joysticks 10a and 10b are rotated in opposite directions and when the support pressure of the arm holding the right joystick 10b having large steering torque of the left and right joysticks 10a and 10b is not excessively low and the support pressure of the arm holding the left joystick 10a having large steering torque is excessively low, it is determined that the steering input of the right joystick 10b having large steering torque is reliable. Accordingly, the vehicle is steered on the basis of the steering input of the right joystick 10b having large steering torque.

The method may further include a reaction force control step of synchronizing the steering direction of the joystick having small steering torque with the steering direction of the joystick having large steering torque when it is determined that the steering input of the joystick having large steering torque is reliable.

That is, the steering direction of the left joystick 10a having small steering torque is synchronized with the steering direction of the right joystick 10b having large steering torque.

Further, the pressure detection step determines that the normal steering condition is not satisfied when steering inputs are applied in opposite directions to the left and right joysticks 10a and 10b, the reliability determination step determines that the steering input of the joystick having large steering torque is reliable when the support pressure of the arm holding the joystick having large steering torque is the lower-limit critical value or less or the support pressure of the arm holding the joystick having small steering torque is the lower-limit critical value or more, and the steering control step calculates the average steering input value of the left and right joysticks 10a and 10b, and generates a target steering angle and steers the vehicle on the basis of the calculated average steering input value.

That is, when the left and right joysticks 10a and 10b are rotated in opposite directions and when the support pressure of the arm holding the right joystick 10b having large steering torque of the left and right joysticks 10a and 10b is excessively low or the support pressure of the arm holding the left joystick 10a having small steering torque is not excessively low, it is determined that the steering inputs of the left and right joysticks 10a and 10b are both reliable. Accordingly, the vehicle is steered on the basis of the average of the reliable steering angles of the left and right joysticks 10a and 10b.

The method may further include a steering force control step of providing reaction torque to the joystick having small steering torque by the steering torque difference between the left and right joysticks 10a and 10b when it is determined that the steering input of the joystick having large steering torque is reliable.

Further, it is possible to provide reaction torque to the joystick having small steering torque in a haptic type.

That is, by additionally providing the steering torque difference between the left and right joysticks 10a and 10b to the joystick having small steering torque, steering based on the joystick having large steering torque is induced.

Hereafter, a control process of the turning-safety control logic according to embodiments of the present invention is described with reference to FIG. 11.

A rapid-turning state of a vehicle is determined on the basis of lateral acceleration Ay and a steering angle SWA of the vehicle while the vehicle is driven.

For example, an absolute lateral acceleration value |Ay| and a critical lateral acceleration value $Ay_{threshold}$ of a vehicle are compared (S10), and when the absolute lateral acceleration value |Ay| exceeds the critical lateral acceleration value $Ay_{threshold}$, an absolute steering angle value |SWA| and a critical steering angle value $SWA_{threshold}$ of the joysticks 10a and 10b are compared (S11).

When the absolute steering angle value |SWA| exceeds the critical steering angle value $SWA_{threshold}$, as the result of comparison in S11, it is determined that the vehicle is being rapidly turned.

In this case, the turning direction of the vehicle is determined on the basis of the lateral acceleration Ay of the vehicle (S12). That is, it is determined that the vehicle is being turned left when the lateral acceleration Ay of the vehicle exceeds 0, and it is determined that the vehicle is being turned right when the lateral acceleration Ay of the vehicle does not exceed 0.

However, when any one is not satisfied, as the results of comparison in S10 and S11, it is determined that the vehicle is not being rapidly turned. In this case, a target steering angle $SA_{target}$ is generated by multiplying the average $((SWA_L+SWA_R)/2)$ of the steering angles of the left and right joysticks 10a and 10b by a steering gear ratio GR, and the road wheel actuator 60 is controlled and the vehicle is steered on the basis of the target steering angle $SA_{target}$ (S21).

When the vehicle is being turned left, as the result of the determination in S12, whether an armrest support pressure $P_L$ of the left arm is less than a lower-limit critical value $P_{min}$ is determined (S13). When the armrest support pressure $P_L$ of the left arm is less than the lower-limit critical value $P_{min}$, as the result of the determination in S13, whether the armrest support pressure $P_R$ of the right arm exceeds an upper-limit critical value $P_{max}$ is determined (S14).

When the armrest support pressure $P_L$ of the left arm is less than the lower-limit critical value $P_{min}$ in S13, it may be considered that the left arm has been taken off the armrest. Further, when the armrest support pressure $P_R$ of the right arm exceeds the upper-limit critical value $P_{max}$ in S14, it may be considered that the right arm is fully leaned on the armrest and the driver's body is fully leaned on the right armrest 20b.

In this case, the reaction torque $T_{FL}$ provided to the left joystick 10a is increased in proportion to the lateral acceleration Ay, whereby the left joystick 10a is fixed so that the driver can hold on to the joystick (S15). K is a gain value.

Further, a target steering angle $SA_{target}$ is generated by multiplying the steering angle $SWA_R$ of the right joystick 10b by the steering gear ratio GR, and the road wheel actuator 60 is controlled and the vehicle is steered on the basis of the target steering angle $SA_{target}$ (S16).

On the other hand, when the armrest support pressure $P_L$ of the left arm is not less than the lower-limit critical value $P_{min}$ or the armrest support pressure $P_R$ of the right arm does not exceed the upper-limit critical value $P_{max}$, as the results of the determinations in S13 and S14, a target steering angle $SA_{target}$ is generated by multiplying the average (($SWA_L$+$SWA_R$)/2) of the steering angles of the left and right joysticks 10a and 10b by the steering gear ratio GR, and the road wheel actuator 60 is controlled and the vehicle is steered on the basis of the target steering angle $SA_{target}$ (S21).

Further, when the vehicle is being turned right, as the result of S12, control is performed in the same way with only the left and right directions in the above left-turning situation changed.

That is, whether the armrest support pressure $P_R$ of the right arm is less than the lower-limit critical value $P_{min}$ is determined (S17), and when the armrest support pressure $P_R$ of the right arm is less than the lower-limit critical value $P_{min}$, as the result of the determination in S17, whether the armrest support pressure $P_L$ of the left arm exceeds the upper-limit critical value $P_{max}$ is determined (S18).

When the armrest support pressure $P_R$ of the right arm is less than the lower-limit critical value $P_{min}$, as the result of the determination in S17, and when the armrest support pressure $P_L$ of the left arm exceeds the upper-limit critical value $P_{max}$, as the result of the determination in S18, it may be considered that the driver's body is fully leaned on the left armrest 20a.

In this case, the reaction torque $T_{FL}$ provided to the right joystick 10b is increased in proportion to the lateral acceleration Ay, whereby the right joystick 10b is fixed so that the driver can hold on to the joystick (S19).

Further, a target steering angle $SA_{target}$ is generated by multiplying the steering angle $SWA_L$ of the left joystick 10a by the steering gear ratio GR, and the road wheel actuator 60 is controlled and the vehicle is steered on the basis of the target steering angle $SA_{target}$ (S20).

On the other hand, when the armrest support pressure $P_R$ of the right arm is not less than the lower-limit critical value $P_{min}$ or the armrest support pressure $P_L$ of the left arm does not exceed the upper-limit critical value $P_{max}$, a target steering angle $SA_{target}$ is generated by multiplying the average (($SWA_L$+$SWA_R$)/2) of the steering angles of the left and right joysticks 10a and 10b by the steering gear ratio GR, and the road wheel actuator 60 is controlled and the vehicle is steered on the basis of the target steering angle $SA_{target}$ (S21).

Meanwhile, a control process of the steering angle synchronization control logic according to embodiments of the present invention is described with reference to FIG. 12.

The steering states of the left and right joysticks 10 and 10b are determined on the basis of steering angle speeds $SWR_L$ and $SWR_R$ and steering torque $T_L$ and $T_R$ of the joysticks 10a and 10b while the vehicle is driven.

For example, whether the product of the steering angle speeds $SWR_L$ and $SWR_R$ of the left and right joysticks 10a and 10b is less than 0 is determined (S30). When the product is less than 0, as the result of the determination in S30, whether the product of the steering torque $T_L$ and $T_R$ of the left and right joysticks 10a and 10b is less than 0 is determined (S31).

When the product is less than 0, as the result of the determination in S31, it is determined that steering inputs of the left and right joysticks 10a and 10b have been applied in opposite directions.

In this case, the steering intention of the driver is determined on the basis of the magnitude of the absolute values of the steering torque (S32). That is, when the absolute steering torque value $|T_R|$ of the right joystick 10b is larger than the absolute steering torque value $|T_L|$ of the left joystick 10a, it may be considered that there is a right-turn steering intention, and in the opposite case, it may be considered that there is a left-turn steering intention.

However, when even any one of them is not satisfied, as the result of the determinations in S30 and S31, it is determined that steering inputs have been applied in the same direction through the left and right joysticks 10a and 10b. In this case, a target steering angle $SA_{target}$ is generated by multiplying the average (($SWA_L$+$SWA_R$)/2) of the steering angles of the left and right joysticks 10a and 10b by the steering gear ratio GR, and the road wheel actuator 60 is controlled and the vehicle is steered on the basis of the target steering angle $SA_{target}$ (S43).

When the right absolute steering torque value $|T_R|$ is large, whether the armrest support pressure $P_R$ of the right arm exceeds the lower-limit critical value $P_{min}$ is determined (S33). When the armrest support pressure $P_R$ of the right arm exceeds the lower-limit critical value $P_{min}$, as the result in S33, whether the armrest support pressure $P_L$ of the left arm is less than the lower-limit critical value $P_{min}$ is determined (S34).

When the armrest support pressure $P_R$ of the right arm exceeds the lower-limit critical value $P_{min}$ in S33, it may be considered that the right arm is on the armrest 20b. Further, when the armrest support pressure $P_L$ of the left arm is less than the lower-limit critical value $P_{min}$ in S34, it may be considered that the left arm has been taken off the armrest 20a.

In this case, a target steering angle $SA_{target}$ is generated by multiplying the steering angle $SWA_R$ of the right joystick 10b by the steering gear ratio GR, and the road wheel actuator 60 is controlled and the vehicle is steered on the basis of the target steering angle $SA_{target}$ (S35).

Further, the steering angle $SWA_L$ of the left joystick 10a is synchronized with the steering angle $SWA_R$ of the right joystick 10b (S36).

On the other hand, when the armrest support pressure $P_R$ of the right arm does not exceed the lower-limit critical value $P_{min}$ or the armrest support pressure $P_L$ of the left arm is not less than the lower-limit critical value $P_{min}$, as the result of S33 and S34, torque corresponding to the steering torque difference $T_R-T_L$ between the left and right joysticks 10a and 10b is added to the reaction torque $T_{FL}$ of the left joystick 10a so that steering is performed on the basis of the right joystick 10b having large steering torque (S37).

Next, a target steering angle $SA_{target}$ is generated by multiplying the average $((SWA_L+SWA_R)/2)$ of the steering angles of the left and right joysticks 10a and 10b by the steering gear ratio GR, and the road wheel actuator 60 is controlled and the vehicle is steered on the basis of the target steering angle $SA_{target}$ (S43).

Further, when the absolute value $|T_L|$ of the left steering torque is larger, as the result of the determination in S32, control is performed in the same way with only the left and right directions changed in comparison to the above situation in which the right steering torque is large.

That is, whether the armrest support pressure $P_L$ of the left arm exceeds the lower-limit critical value $P_{min}$ is determined (S38), and when the armrest support pressure $P_L$ of the left arm exceeds the lower-limit critical value $P_{min}$, as the result of the determination in S38, whether the armrest support pressure $P_R$ of the right arm is less than the lower-limit critical value $P_{min}$ is determined (S39).

When the armrest support pressure $P_L$ of the left arm exceeds the lower-limit critical value $P_{min}$ in S38, it may be considered that the left arm is on the armrest 20a. Further, when the armrest support pressure $P_R$ of the right arm is less than the lower-limit critical value $P_{min}$ in S39, it may be considered that the right arm has been taken off the armrest 20b.

In this case, a target steering angle $SA_{target}$ is generated by multiplying the steering angle $SWA_L$ of the left joystick 10a by the steering gear ratio GR, and the road wheel actuator 60 is controlled and the vehicle is steered on the basis of the target steering angle $SA_{target}$ (S40).

Further, the steering angle $SWA_R$ of the right joystick 10b is synchronized with the steering angle $SWA_L$ of the left joystick 10a (S41).

On the other hand, when the armrest support pressure $P_L$ of the left arm does not exceed the lower-limit critical value $P_{min}$ or the armrest support pressure $P_R$ of the right arm is not less than the lower-limit critical value $P_{min}$, as the result of S38 and S39, torque $T_L-T_R$ corresponding to the steering torque difference between the left and right joysticks 10a and 10b is added to the reaction torque $T_{FR}$ of the right joystick 10b so that steering is performed on the basis of the left joystick 10a having large steering torque (S42).

Next, a target steering angle $SA_{target}$ is generated by multiplying the average $((SWA_L+SWA_R)/2)$ of the steering angles of the left and right joysticks 10a and 10b by the steering gear ratio GR, and the road wheel actuator 60 is controlled and the vehicle is steered on the basis of the target steering angle $SA_{target}$ (S43).

As described above, embodiments of the present invention prevent unintentional steering input due to inclination of the driver's body when a vehicle is rapidly turned, thereby improving steering stability.

Further, when mis-input or steering input by external factors is applied to one of two joysticks 10a and 10b, a vehicle is steered on the basis of the steering input that the driver has intended, whereby steering sturdiness is remarkably improved.

Although the present invention was described with reference to the detailed embodiments, it is apparent to those skilled in the art that the present invention may be changed and modified in various ways without the scope of the present invention and it should be noted that the changes and modifications are included in claims.

What is claimed is:

1. A steering system comprising:
   left and right joysticks respectively disposed at left and right sides of a seat and configured to rotate about rotary shafts to steer;
   feedback actuators configured to provide reaction torque and a steering angle variation to the left and right joysticks, respectively;
   a controller configured to:
     control the feedback actuators,
     generate a target steering angle, and
     steer a vehicle based on a steering input from a driver and factors reflecting a driving state of the vehicle; and
   pressure sensors installed at rear ends of the left and right joysticks and configured to detect support pressures of arms of the driver operating the left and right joysticks, respectively.

2. The steering system of claim 1,
   wherein the rotary shafts are disposed in a front-rear direction of the seat,
   wherein the left and right joysticks are symmetrical in a neutral state, and
   wherein handles of the left and right joysticks are inclined at a predetermined angle toward a center of the seat in the neutral state.

3. The steering system of claim 1, wherein the controller is configured to control the feedback actuators to apply the same-directional reaction torque and the steering angle variation to the left and right joysticks.

4. The steering system of claim 1, wherein the controller is configured to control the feedback actuators to apply the same reaction torque and the same steering angle variation to the left and right joysticks.

5. The steering system of claim 1, wherein the controller is configured to:
   determine reliability of steering input based on the support pressures,
   generate the target steering angle, and
   steer the vehicle based on the reliable steering input.

* * * * *